United States Patent [19]
Ito et al.

[11] Patent Number: 5,567,367
[45] Date of Patent: Oct. 22, 1996

[54] ZERO CORRECTION METHOD FOR A PRESSURE DETECTING DEVICE OF AN INJECTION MOLDING MACHINE

[75] Inventors: Susumu Ito; Masao Kamiguchi, both of Yamanashi; Masato Yamamura, Hachioji; Noriaki Neko, Yamanashi; Tatsuhiro Uchiyama, Yamanashi; Yuichi Hosoya, Yamanashi; Nobuto Takeda, Yamanashi; Kaoru Hiraga, Yamanashi, all of Japan

[73] Assignee: Fanuc Limited, Minamitsuru, Japan

[21] Appl. No.: 377,273

[22] Filed: Jan. 23, 1995

[30] Foreign Application Priority Data

Jan. 21, 1994 [JP] Japan ................................. 6-019829

[51] Int. Cl.⁶ ................................................ B29C 45/77
[52] U.S. Cl. .................. 264/40.1; 264/40.5; 264/328.1; 425/145
[58] Field of Search ............................ 264/40.1, 40.5, 264/328.1; 425/135, 145, 149, 170

[56] References Cited

U.S. PATENT DOCUMENTS 5,206,034  4/1993  Yamazaki ........................ 425/149
5,209,936  5/1993  Ihara et al. ...................... 425/149

FOREIGN PATENT DOCUMENTS

| 59-156726 | 9/1984 | Japan . |
| 61-154820 | 7/1986 | Japan . |
| 61-266219 | 11/1986 | Japan . |
| 62-97818 | 5/1987 | Japan . |
| 63-78719 | 4/1988 | Japan . |
| 64-27921 | 1/1989 | Japan . |
| 2-63713 | 3/1990 | Japan . |
| 5-111935 | 5/1993 | Japan . |

*Primary Examiner*—Jill L. Heitbrink
*Attorney, Agent, or Firm*—Staas & Halsey

[57] ABSTRACT

An average is obtained between output readings of a pressure sensor obtained when forward and reverse thrusts are applied to an injection screw by positively driving a servomotor for injection. The average value is used as a correction value for a reading deviation of the pressure sensor. The injection servomotor is positively driven to apply a thrust to the screw. This known thrust and the actual reading of the sensor are compared. A deviation between these values is used as the correction value for the reading deviation of the sensor.

15 Claims, 4 Drawing Sheets

ZERO CORRECTION METHOD FOR A PRESSURE DETECTING DEVICE OF AN INJECTION MOLDING MACHINE

BACKGROUND OF THE INVENTION

1. Field of the Invention

The present invention relates to an improvement of a zero correction method for a pressure detecting device of an injection molding machine.

2. Description of the Related Art

It is generally known that a pressure sensor for detecting a pressure, which acts on a screw of an injection molding machine, is provided between a thrust bearing for rotatably supporting the screw and a housing of an injection mechanism. In order to transmit the pressure acting on the screw to the pressure sensor accurately, in this case, the sensor is held under a pre-load between the thrust bearing and the housing of the injection mechanism. Accordingly, the pressure sensor undergoes a fixed compressive strain which is attributable to the pre-load. Thus, in a pressure detecting device of the conventional injection molding machine, a load equivalent to the pre-load is applied to the pressure sensor even when no substantial load is acting on the screw.

To cope with this, the output of the pressure sensor is read immediately before the start of a metering or injection stage, the read value is subtracted, as an error caused by an initial compressive strain in the pressure sensor, from a detected value obtained afterward in a sampling stage, and feedback control of an injection pressure is effected with the resulting remainder regarded as the pressure which acts on the screw. One such zero correction method for a pressure sensor is described in a Japanese Patent Application published as KOKAI 61-266219.

According to this method, zero correction is carried out on the assumption that no load acts on the screw at the point of time immediately before the start of the metering or injection stage. At the time just before the start of the metering or injection stage, however, resin exists in an injection cylinder, and sometimes influences the reception of pressure by the screw. Accordingly, the screw cannot always be in a stable state, so that accurate zero correction cannot be guaranteed.

Disclosed in a Japanese Patent Application published as KOKAI 2-63713, moreover, is a technique in which an injection force transmitting member, which connects a drive source and a screw, is provided with a pressure sensor without a preload thereon. This pressure sensor also requires zero correction, since it is subject to changes in properties attributable to temperature variation and aging. During actual operation for the correction, however, some external force of an unknown magnitude, such as a resin pressure, influences the reception of pressure by the screw, thus making it difficult to ensure accurate zero correction.

OBJECT AND SUMMARY OF THE INVENTION

The object of the present invention is to provide a zero correction method for a pressure detecting device of an injection molding machine, which ensures accurate zero correction of a pressure sensor despite the existence of an unaccountable external force of an unknown magnitude acting on an injection screw.

According to a first aspect of the present invention, a drive source (motor) is first driven in a forward direction (screw advancing direction) to deliver a force f. This force f is bound to suffer a loss $\mu$ attributable to frictional resistance or the like on the way to the proximal portion of a screw. In other words, a reaction force (f–$\mu$) practically acts on the screw. Owing to changes in properties attributable to temperature variation and aging, on the other hand, a pressure sensor for detecting an axial pressure on the screw is always subject to a deviation $\Delta$.

In this case, a reading a of the pressure sensor is $$a = f - \mu + \Delta.$$

Since $\mu$ acts so as to hinder f, these values have opposite signs.

Subsequently, a force –f, which has the same absolute value and is directed oppositely (screw retreating direction), is delivered from the drive source. Thereupon, a reading b of the pressure sensor is $$b = -f + \mu + \Delta.$$

From the foregoing equations, therefore, we obtain a+b =2$\Delta$, and hence, $$\Delta = (a+b)/2.$$

Thereupon, if the value $\Delta$ is used as a correction value for the readings a and b of the pressure sensor, the corrected readings of the sensor are $$a - \Delta = f - \mu,$$

and $$b - \Delta = -f + \mu.$$

Thus, a force actually acting on the screw is given in either case. According to this aspect, as described above, zero correction of the pressure sensor can be effected accurately even in the case where the screw or other member is subjected to an unknown external force, or where a loss caused between the drive source and an injection force transmitting member varies.

According to a second aspect of the present invention, a force ft (theoretical value) generated corresponding to a driving current d of a motor for use as a drive source is obtained from the following equation:

$$ft = F \cdot d,$$

where F is a coefficient which is settled depending on the construction of an injection force transmitting member or the like.

At the same time, the output of a pressure sensor is monitored. If the output value is fm, it is given by $$fm = ft - \mu + \Delta.$$

If $\mu$, which actually is a small value, is regarded as zero, we obtain $$fm - ft = \Delta.$$

If the value A is used as a correction value for the reading of the pressure sensor, as in the aforesaid case, we obtain $$fm - \Delta = ft.$$

This corrected reading of the pressure sensor is equal to the force ft from the drive source (loss $\mu$ is neglected).

DETAILED DESCRIPTION OF THE PREFERRED EMBODIMENTS

Figure 1:
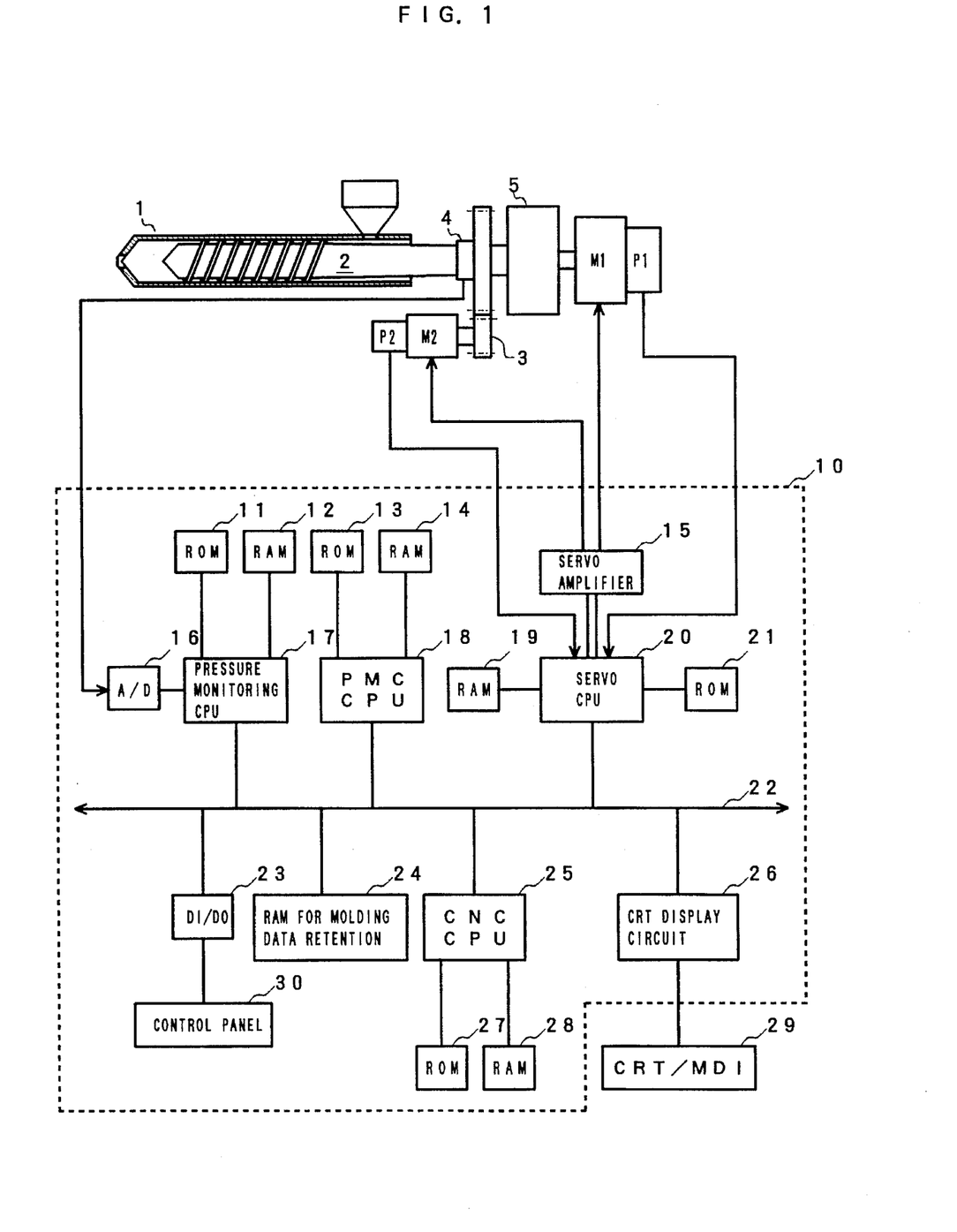
FIG. 1 is a block diagram showing the principal part of an injection molding machine according to one embodiment to which a zero correction method of the present invention is applied.

Preferred embodiments of the present invention will now be described with reference to the accompanying drawings. FIG. 1 is a block diagram showing the principal part of an injection molding machine according to one embodiment to which a zero correction method of the present invention is applied. In FIG. 1, numerals 1 and 2 denote an injection cylinder and a screw, respectively, of the injection molding machine. The screw 2 is driven along an injection axis by means of a servomotor M1 for injection, for use as a drive source, through the medium of a drive transducer 5 for converting an axial rotation of the drive source into a linear motion along the injection axis. Also, the screw 2 is rotated by means of a servomotor M2 for screw rotation.

An injection force transmitting member, which constitutes the proximal portion of the screw 2, is provided with a pressure sensor 4 which detects forward (screw advancing) and reverse (screw retreating) pressures on the screw. More specifically, the pressure sensor 4 detects resin pressures which act in the axial direction of the screw 2, e.g., injection hold pressure for an injection dwell process, screw back pressure for a metering/kneading process, etc.

The pressure sensor 4 used in the present embodiment is based on the one as disclosed in the above-mentioned KOKAI 2-63713. Thus, the sensor 4 is provided on the injection force transmitting member, which connects the drive source (injection servomotor M1) and the screw 2, without being subjected to a pre-load. Since this pressure sensor, like the aforesaid one mounted in another form, is subject to changes in properties attributable to temperature variation and aging, it requires zero correction.

The injection servomotor M1 is provided with a pulse coder P1 for detecting the position and moving speed of the screw 2. The screw rotation servomotor M2 is provided with a speed sensor P2 for detecting the rotating speed of the screw 2.

A control device 10 of the injection molding machine comprises a CPU 25 for CNC as a microprocessor for numerical control, a CPU 18 for PMC as a microprocessor for programmable machine controller, a servo CPU 20 as a microprocessor for servo control, and a pressure monitoring CPU 17 for sampling the injection hold pressure and screw back pressure with use of an A/D converter 16. Information is transferred between these microprocessors by selecting inputs and outputs through a bus 22.

The CPU 18 for PMC is connected with a ROM 13, which is stored with a sequence program for controlling the sequence operation of the injection molding machine, and a RAM 14 for temporary storage of computation data and the like. The CPU 25 for CNC is connected with a ROM 27, which is stored with programs for controlling the individual axes of the injection molding machine and the like, and a RAM 28 for temporary storage of computation data and the like.

The servo CPU 20 is connected with a ROM 21 loaded with an exclusive control program for servo control and a RAM 19 for temporary storage of data. The pressure monitoring CPU 17 is connected with a ROM 11, which is loaded with a control program associated with a sampling process for obtaining pressure data and the like, and a RAM 12 for temporary storage of data.

Further, the servo CPU 20 is connected with a servo amplifier 15 which drives servomotors for various axes for mold clamping, ejector (not shown) operation, injection, screw rotation, etc. in response to commands from the CPU 20. Each of outputs from the pulse coders P1 and P2, which are attached to the injection servomotor M1 and the screw rotation servomotor M2, respectively, is fed back to the servo CPU 20. A current position storage register and a current speed storage register of the memory 19 are stored, respectively, with the value of the current position of the screw 2, which is computed by the servo CPU 20 in accordance with feedback pulses from the pulse coder P1, and the value of the rotating speed of the screw 2, which is detected by means of the speed sensor P2.

An interface 23 is used to receive signals from limit switches attached to various parts of the injection molding machine and a control panel and deliver various commands to peripheral equipment of the machine. A manual data input device 29 with display is connected to the bus 22 through a CRT display circuit 26, whereby monitor display screens and function menus can be selected and various data can be inputted. The device 20 is provided with a ten-key pad for numerical data input, various function keys, etc.

A RAM 24 for storing molding data, which is formed of a nonvolatile memory, is used to store molding conditions (injection and dwell condition, metering condition, etc.) for injection molding operation and various set values, parameters, macro variables, etc.

In this arrangement, the CPU 25 for CNC distributes pulses to the servomotors for the individual axes in accordance with a control program in a ROM 27, while the servo CPU 20 carries out servo control, such as position loop control, speed loop control, current loop control, etc., in the conventional manner, thereby executing the so-called digital servo process, in accordance with movement commands given to the individual axes by pulse distribution and position and speed feedback signals detected by means of detectors, such as the pulse coder P1 and the speed sensor P2.

Figure 2:
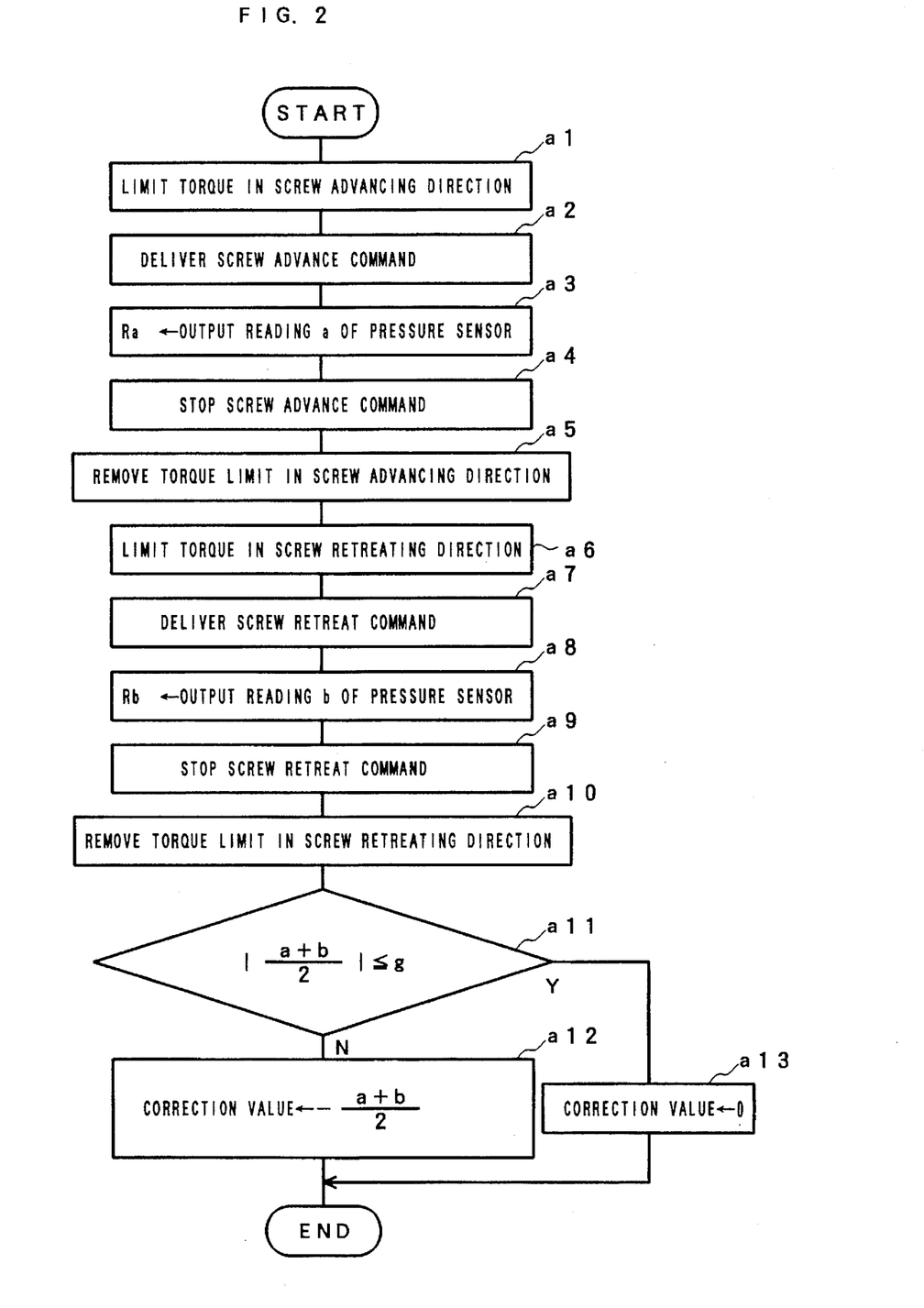
FIG. 2 is a flowchart showing an outline of a zero correction process according to a first embodiment of the invention.

FIG. 2 is a flowchart showing an outline of a zero correction process employed in this embodiment to which the method of the present invention is applicable. This process is executed in accordance with a control program stored in the ROM 13 by of the CPU 18 for PMC.

The zero correction process can be executed during any of the following periods of time if it is incorporated as one sequence in the sequence program of the ROM 13:

(1) period between the completion of dwell and the start of metering during continuous molding operation;

(2) period between the completion of suck-back and the start of injection during the continuous molding operation;

(3) period after the completion of automatic purge; and
(4) period between the completion of advance of the screw and the start of retreat of the screw during the automatic purge.

During the periods (1) and (2), the zero correction process may be executed at every shot or at every predetermined number of shots. During the period (3), the correction process may be executed at every purging operation or at every predetermined number of purging cycles.

A control program associated with the correction process may be provided independently of the sequence program so that it can be freely started in response to a command from the manual data input device 29 with display. Thereupon, the control program can be carried out at a desired point of time before the start of or after the completion of manual or continuous operation, for example. In this case, moreover, an operator can start the program by the display of the manual data input device 29 or a control panel 30 connected to the bus 22 of the control device 10 through the interface 23. At this point of time, the zero correction process may be executed with the screw 2 and the injection cylinder 1 bound to each other by residual resin or with the screw 2 fixed and prevented from moving by means of a jig. Moreover, a predetermined forward or backward thrust may be applied to the screw 2 in a manner such that the screw 2 is prevented from advancing or retreating.

Normally, the timing for the execution of the zero correction process during the molding operation of the injection molding machine is limited to the aforementioned periods (1) to (4) lest the molding operation of the machine be influenced by the action of the screw 2 in the zero correction process. It is to be noted, therefore, that the object of the timing selection is different from that of the aforementioned prior art, KOKAI 61-266219, in which accurate zero correction is attempted by selecting the timing for the removal of an external force acting on the screw 2.

Referring now to the flowchart of FIG. 2, the zero correction process according to the present embodiment will be described in the following.

The CPU 18 for PMC, having started the zero correction process in accordance with the program stored in the ROM 13, first restricts the driving current of the injection servomotor M1 to a given level d which will not cause the screw 2 to advance actually (Step a1), and causes the CPU 25 for CNC to start the delivery of a screw advance command (Step a2). Then, the CPU 18 for PMC reads a detection output from the pressure sensor 4 in this state through the A/D converter 16 and the pressure monitoring CPU 17, and stores a register Ra with the read value a as an output value of the pressure sensor 4 obtained when the forward driving current is applied to the screw 2 (Step a3).

The reason why driving current d of the injection servomotor M1 is restricted to a level which will not cause the screw 2 to advance actually, is for preventing the screw 2 from moving unexpectedly and affecting the molding operation of the injection molding machine. Thus, in the case where the screw 2 and the injection cylinder 1 are bound to each other with the residual resin or the screw 2 is fixed and prevented from moving by means of the jig, there is no special restrictions on the level of the driving current d in carrying out the zero correction process. Although the level of the driving current d is not specially restricted, the screw inevitably will move if it undergoes a thrust greater than the force to bind the screw with a residual resin or greater than the force to fix the screw with the jig, so that a thrust not greater than such a binding force or fixing force is applied to the screw.

The above is an explanation of the upper limit of the driving current d. The lower limit of the current d must have a value (an absolute value), which enables the injection servomotor M1 to influence the screw 2, by overcoming disturbance, such as friction, in the mechanism of the drive transducer 5, irrespective of conditions for performing a zero correction process.

A force f, which is generated corresponding to the driving current d of the injection servomotor M1, is subject to a loss $\mu$ attributable to resistance or the like in the mechanism of the drive transducer 5 in the middle before it is transmitted as a thrust to the proximal portion of the screw 2. Thus, if the servomotor M1 is driven by the driving current d to move the screw 2 in the axial direction, then the screw 2 will be moved straight by of a force $(f-\mu)$, that is, a reaction force $(f-\mu)$ will act on the screw 2. Since the loss $\mu$ ($>0$) is a force which acts in the direction to reduce f, it is subtracted from f if f is positive, and is added to f if f is negative.

Thus, if the injection servomotor M1 is driven by means the driving current d to move the screw 2 in the advancing direction, then the force $(f-\mu)$ will act on the pressure sensor 4. If the servomotor M1 is driven by a driving current $-d$ to move the screw 2 in the retreating direction, on the other hand, then a force $(-f+\mu)$ will act on the sensor 4.

If a deviation of a reading of the pressure sensor 4 caused by changes in properties attributable to temperature variation and aging is $\Delta$, $(f-\mu+\Delta)$ is read from the pressure sensor 4 when the screw 2 advances, and $(-f+\mu+\Delta)$ is read when the screw retreats. The deviation $\Delta$ is a value independent of a force $(f-\mu \text{ or } -f+\mu)$ which acts on the pressure sensor 4.

Since the value a stored in the register Ra in Step a3 is a value obtained while the screw 2 is advancing, therefore, it is given by $$a = f - \mu + \Delta.$$

Subsequently, the CPU 18 for PMC stops the delivery of the screw advance command from the CPU 25 for CNC (Step a4), and cancels the restrictions on the driving current of the injection servomotor M1 (Step a5). The CPU 18 for PMC then restricts the driving current of the servomotor M1 to $-d$, and causes the CPU 25 for CNC to start the delivery of a screw retreat command (Steps a6 and a7). Then, the CPU 18 for PMC reads a detection output from the pressure sensor 4 in this state through the A/D converter 16 and the pressure monitoring CPU 17, and stores a register Rb with the read value b (Step a8). The value b stored in the register Rb is given by $$b = -f + \mu + \Delta.$$

Further, the CPU 18 for PMC stops the delivery of the screw retreat command from the CPU 25 for CNC (Step a9), and lifts the restrictions on the driving current of the injection servomotor M1 (Step a10). Then, the CPU 18 for PMC calculates an average of the values a and b stored in the registers Ra and Rb, respectively, and obtains the value of the deviation $\Delta$ [$(a+b)/2 = \Delta$] of the reading of the pressure sensor 4. Thereafter, the CPU 18 for PMC determines whether or not the absolute value of the deviation $\Delta$ is not greater than a predetermined allowable upper limit value g ($g > 0$) (Step a11).

If the deviation $\Delta$ of the reading is greater than the allowable upper limit value g (decision: N), the CPU 18 for PMC inverts the sign of the value $(a+b)/2$ which corresponds to the deviation $\Delta$, and stores in the nonvolatile memory 24 the resulting value as a correction value for the present point of time (Step a12), whereupon the zero correction process for the present cycle terminates. If the deviation Δ of the reading is extremely great, e.g., greater than a set value g' (g'>g), so that an abnormal state worse than normal deterioration is detected, an abnormal message or the like may be displayed on the display screen of the manual data input device 29 with display. Every time the process of Step a12 is executed, moreover, the correction value obtained in this process, along with the date and time, may be additionally stored in a file of the nonvolatile memory 24. By doing this, the pressure sensor 4 can be checked afterward for its history of correction with reference to the file.

If the deviation Δ of the reading is not greater than the allowable upper limit value g, it results in no substantial awkward situation. Accordingly, the CPU 18 for PMC stores 0 as the correction value in the nonvolatile memory 24 (Step a13), and treats the output reading of the pressure sensor 4 directly as a true detection output, whereupon the zero correction process for the present cycle terminates.

The correction value stored in the process of Step a12 or a13 is kept in the nonvolatile memory 24 before the execution of another zero correction process. Every time a zero correction process is executed, thereafter, a new correction value obtained in the correction process is stored as an up-to-date value in the memory 24.

In storing the output of the pressure sensor 4 in Step a3 or a7, data can be sampled more accurately by carrying out a reading or storing process after standing by for a predetermined period of time after the start of the delivery of the movement command in Step a2 or a7 so that the driving torque of the injection servomotor M1 is stabilized, or by carrying out a given number of reading processes so that the average of read values can be stored as an output reading of the sensor 4.

According to these processes, f and μ are eliminated as the average of the values a (=f−μ+Δ) and b (=−f+μ+Δ) stored in the registers Ra and Rb is calculated, so that the reading deviation Δ can be obtained without detecting the actual force (f−μ or −f+μ) which acts on the pressure sensor 4.

Figure 4:
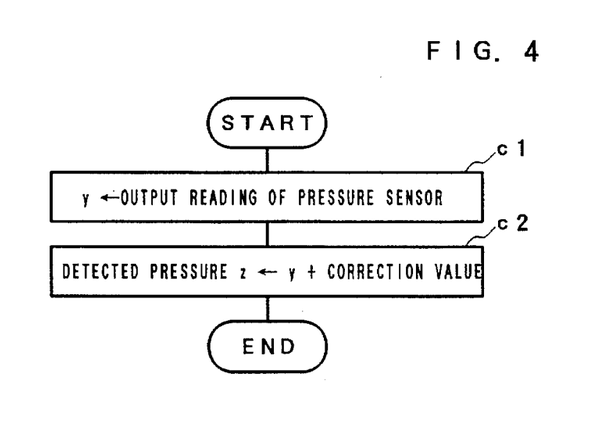
FIG. 4 is a flowchart showing an outline of a detected pressure correcting process corresponding to each embodiment.

The pressure monitoring CPU 17 temporarily stores a value y every time an injection hold pressure or screw back pressure is inputted from the pressure sensor 4 via the A/D converter 16, in accordance with a program for a detected pressure correcting process shown in FIG. 4 (Step c1). Also, the CPU 17 obtains a true detected pressure z by adding the correction value ((a+b)/2 or zero) stored in the nonvolatile memory 24 to the reading y of the sensor 4 (Step c2), and delivers the value z as a feedback value or sampling data for the pressure control.

In the zero correction process described above, substantially the same processing as the one shown in FIG. 2 may be effected by using the true detected pressure z corrected by the pressure monitoring CPU 17, instead of directly reading the detection output y from the A/D converter 16 in the processes of Step a3 and a8. In this case, however, the average (a+b)/2 of the output readings is subtracted from the current correction value in the nonvolatile memory 24, and the resulting value is stored as a new correction value in the nonvolatile memory 24, instead of executing the process of Step a12, that is, the process of Step a13 is omitted, for the following reasons. In the case where substantially the same processing as the one shown in FIG. 2 is carried out by using the true detected pressure z corrected by the pressure monitoring CPU 17, the true detected pressure z itself is delivered, as a value containing preceding correction values, from the CPU 17 to the CPU 18 for PMC, so that the preceding correction values must be corrected by (a+b)/2 in the process which replaces Step a12. Even though the deviation (a+b)/2 is within the allowable range g, moreover, the preceding correction values must be kept in the nonvolatile memory 24 without executing the process of Step a13.

In any case, according to the embodiment described above, the disturbance, such as friction, in the mechanism of the drive transducer 5 is eliminated by applying forward and reverse predetermined thrusts to the screw 2 to obtain the average of the output readings from the pressure sensor 4, whereby the correction value for zero correction can be obtained with good accuracy. Since the friction or other disturbance in the mechanism of the transducer 5 substantially has a small enough value, however, the correction value for zero correction can be easily calculated by obtaining the difference between the output reading of the sensor 4 obtained when a given thrust in only one direction (screw advancing or retreating direction) is applied to the screw 2 and the aforesaid predetermined thrust.

Figure 3:
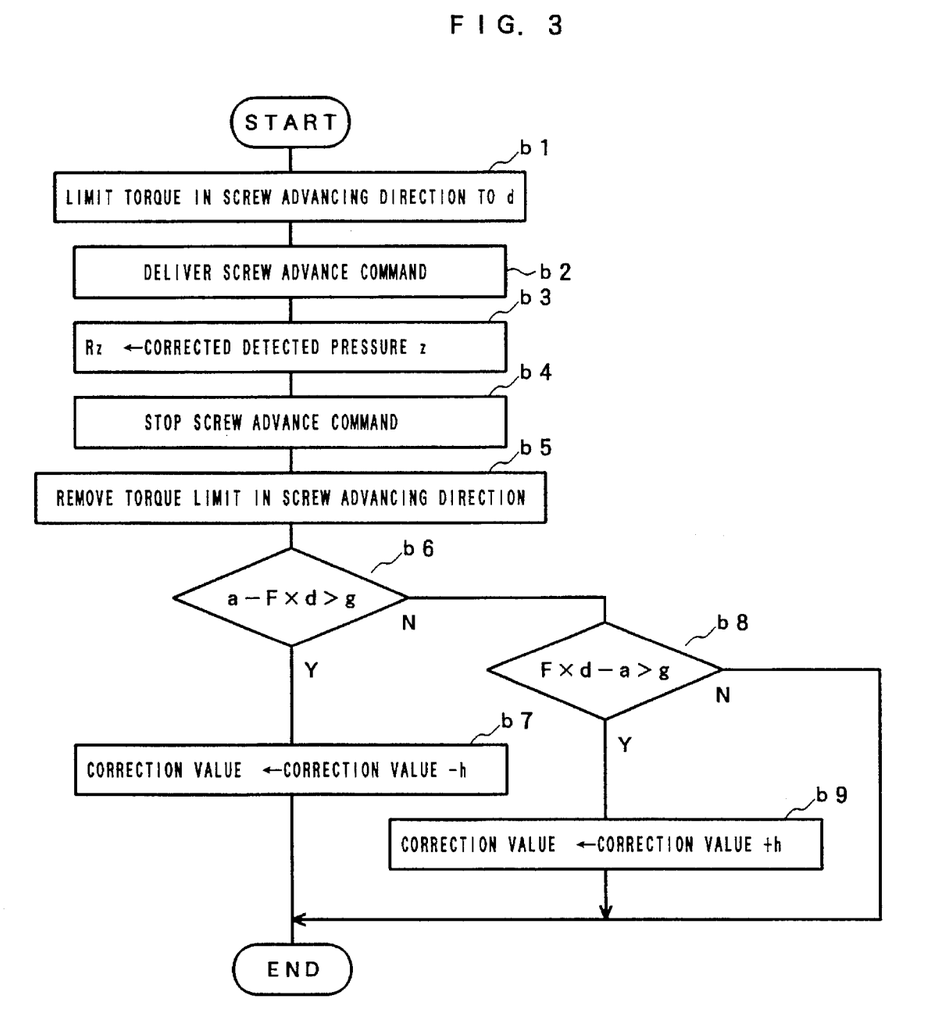
FIG. 3 is a flowchart showing an outline of a zero correction process according to a second embodiment of the invention.

FIG. 3 is a flowchart showing one such example of the zero correction process. As in the foregoing embodiment, the zero correction process according to this embodiment is carried out with any desired timing during the period between the completion of dwell and the start of metering, period between the completion of suck-back and the start of injection, period after the completion of automatic purge, or period between the completion of advance of the screw and the start of retreat of the screw in each purging cycle during the continuous automatic purge.

Referring now to the flowchart of FIG. 3, the zero correction process according to the present embodiment will be described.

The CPU 18 for PMC, having started the zero correction process in accordance with the program in the ROM 13, first restricts the driving current of the injection servomotor M1 to a given level d such that the screw 2 never moves actually (Step b1), and causes the CPU 25 for CNC to start the delivery of a screw movement command (Step b2). Then, the CPU 18 for PMC reads a detection output z from the pressure monitoring CPU 17 in this state, and stores in a register Rz the read value as an output value of the pressure sensor 4 obtained when a predetermined driving current d is applied to the screw 2 (Step b3).

The detection output z from the pressure monitoring CPU 17 read in Step b3 is a value which is obtained by correcting the reading of the pressure sensor 4 by the correction value obtained in the preceding cycle of this process. (In the case where this cycle is a first processing cycle, the value of the detection output z is equal to the very reading y of the sensor 4.)

Theoretically, the force f generated from the injection servomotor M1, corresponding to the driving current d, may be given by $$f = F \times d,$$

where F is a coefficient which is indicative of the relationship between the axial output torque of the injection servomotor M1 and the reduction ratio of the drive transducer 5. In this embodiment, the correction value for zero correction is obtained by neglecting the friction or other disturbance in the mechanism of the drive transducer 5 (i.e., μ=0) and supposing that the force f acts directly on the proximal portion of the screw 2 or the pressure sensor 4.

The reason why driving current d of the injection servomotor M1 is restricted to a level such that the screw 2 never moves actually is for preventing the screw 2 from acting unexpectedly for the zero correction process and affecting the molding operation of the injection molding machine, as in the case of the foregoing embodiment. There is no special restrictions on the level of the driving current d in carrying out the zero correction process with the screw 2 and the injection cylinder 1 bound to each other with the residual resin or with the screw 2 fixed and prevented from moving by means of the jig. The above is an explanation of the upper limit of the driving current d. As in the foregoing embodiment, the lower limit of the current d must have a value (an absolute value) which enables the injection servomotor M1 to influence the screw 2 by overcoming disturbance, such as friction, in the mechanism the drive transducer 5, irrespective of conditions for performing a zero correction process.

Subsequently, the CPU 18 for PMC stops the delivery the screw movement command from the CPU 25 for CNC (Step b4), and cancels the restrictions on the driving current of the injection servomotor M1 (Step b5). Then, the CPU 18 for PMC obtains a deviation [z−F×d] or [F×d−z] between the thrust f (=F×d) applied to the screw 2 and the detection output z from the pressure monitoring CPU 17, and determines whether or not the obtained value is within the allowable range g (g>0) (Step b6, b8).

If the value [z−F×d] is greater than g, that is, if the decision in Step b6 is Y (Yes), then the reading deviation of the pressure sensor 4 is greater than the allowable value g, and its direction is positive. Accordingly, the CPU 18 for PMC subtracts a set value h from the correction value then stored in the nonvolatile memory 24, and stores the memory 24 with the resulting value as a new correction value (Step b7). It is to be supposed, as mentioned before, that the initial correction value is 0, and that the set value h is previously set in the nonvolatile memory 24 as a value such that $0 < h \leq |\Delta|$ is established with respect to the estimated reading deviation $\Delta$.

If the value [F×d−z] is greater than g, that is, if the decision in Step b8 is Y, then the reading deviation of the pressure sensor 4 is greater than g, and its direction is negative. Accordingly, the CPU 18 for PMC adds the set value h to the correction value then stored in the nonvolatile memory 24, and stores in the memory 24 the resulting value as a new correction value (Step b9).

If the reading deviation of the pressure sensor 4 is smaller than the allowable value g, that is, if the results of decision in Steps b6 and b8 are both N (No), on the other hand, then the reading deviation is within the allowable range. Accordingly, the correction value then stored in the nonvolatile memory 24 is maintained without requiring correction (neither of the processes of Steps b7 and b9 are executed). The correction value once stored in the process of Step b7 or b9 is kept in the nonvolatile memory 24 before execution of another zero correction process. Every time a zero correction process is executed anew, thereafter, a new correction value is stored as an up-to-date value in the memory 24.

The set value h may be previously fixed as a value such that $0 < h \leq |\Delta|$ is established with respect to the estimated reading deviation $\Delta$, as mentioned before. If h is set at too small a value, however, it is difficult to eliminate the reading deviation by carrying out the zero correction process shown in FIG. 3 only once. Thus, in the case where the zero correction is not effected frequently, e.g., if the zero correction process is carried out only at a desired point of time after the completion of automatic purge or before the start or after the completion of manual or continuous operation, it is advisable to repeat continuously the process of Step b6 and the subsequent processes, which constitute part of the process of FIG. 3, as one cycle of zero correction so that the results of decision in Step b6 and b8 are both N. If it is difficult to specify the set value h (to predict a value satisfying $0 < h \leq |\Delta|$), moreover, the CPU 18 for PMC is caused to carry out a computation, $h = k \times |z - F \times d| (0 < k \leq 1)$, in Steps b7 and b9 so that it can calculate a proper value for h for itself, instead of previously setting the value h in the nonvolatile memory 24. Furthermore, the CPU 18 for PMC may be caused to execute the processes of Steps b7 and b9 by putting $h = |z - F \times d|$. Even if the zero correction process is executed only at a desired point of time after the start or completion of manual or continuous operation, in this case, the zero correction process shown in FIG. 3 or the process of Step b6 and the subsequent processes, which constitute part of the process of FIG. 3, need not be repeatedly executed. In the case where the reading deviation $|z - F - d|$ is extremely large, e.g., if it is greater than the set value g' (g'>g) so that an abnormal state worse than normal deterioration is detected, an abnormal message or the like may be displayed on the display screen of the manual data input device 29 with display, as in the case of the foregoing embodiment. Alternatively, the history of the correction value may be stored in the nonvolatile memory 24.

A description of a detected pressure correcting process executed by the pressure monitoring CPU 17 will be omitted, since this process is identical with the one shown in FIG. 4.

As is evident from the above description of the embodiments, the output from the pressure sensor 4 is read in the state where a predetermined thrust is positively applied to the screw 2 by the injection servomotor M1. In this regard, the method of the invention is different from the conventional method in which the output from the pressure sensor is read with the screw stopped in a manner such that the drive source for the screw is substantially braked without torque control, and the read output is used as a correction value for the reading deviation. According to these embodiments, the force acting on the pressure sensor 4, which is located between the screw 2 and the injection servomotor M1, is completely equivalent to the thrust corresponding to the axial output from the servomotor M1, except for a loss caused by resistance or the like in the mechanism of the drive transducer 5, even in the case where the screw 2 is subjected to an unexpected reaction force of the resin or the like. The reading deviation (correction value) of the pressure sensor 4 is obtained by comparing the thrust corresponding to the axial output from the injection servomotor M1 and the pressure actually detected by the sensor 4. According to these embodiments, therefore, the reading deviation (correction value.) peculiar to the sensor 4 can be accurately detected without regard to the external force which acts directly on the screw 2.

In the zero correction process of the embodiment shown in FIG. 2, moreover, the loss caused by resistance or the like in the mechanism of the drive transducer 5 is eliminated by the forward or reverse drive of the screw 2, so that the reading deviation (correction value) peculiar to the pressure sensor 4 can be securely obtained without taking the loss into consideration.

Described in a Japanese Patent Application published as KOKAI 5-111935 is an inspection method for an injection molding machine in which deterioration effects of the machine, including wear of various parts of the injection mechanism, are detected. The deterioration effects of the injection molding machine can be detected more satisfactorily if this machine inspection is conducted after executing the zero correction described in connection with the present embodiment.

According to this injection molding machine inspection method disclosed in KOKAI Publication 5-111935, the control device 10 is previously stored with a pressure p which acts on the pressure sensor 4 when the screw 2 of the injection molding machine adjusted in a normal state is driven for injection at a predetermined speed. During periodical inspection or the like, moreover, the screw 2 is driven at the predetermined speed, and the value of the pressure z detected by the pressure sensor 4 is obtained. The deterioration effects of the injection molding machine, including wear of the various parts of the injection mechanism, is detected by comparing the obtained value z with the previously stored value p.

Figure 5:
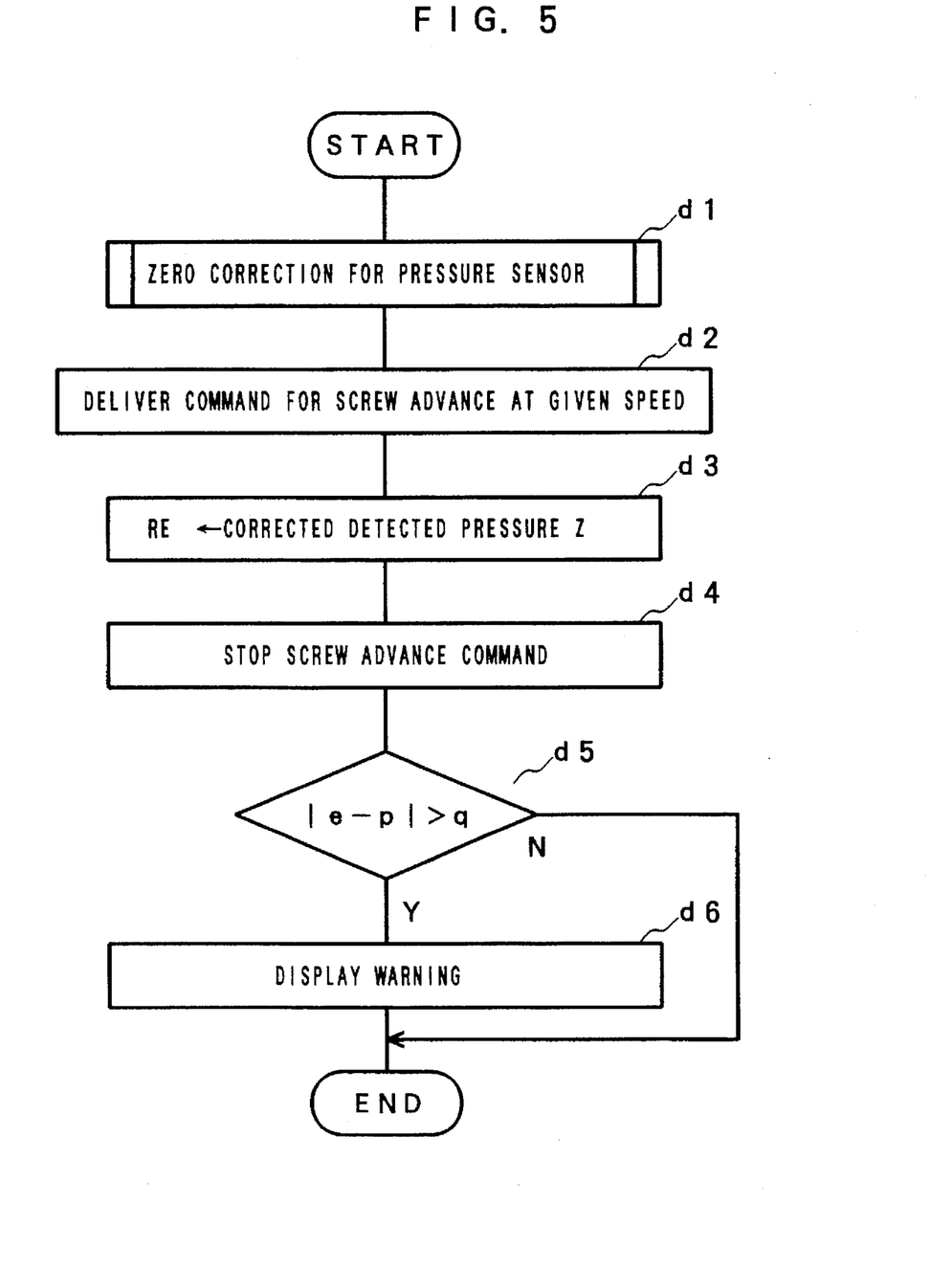
FIG. 5 is a flowchart showing an example of a deterioration detecting process for the inspection of the injection molding machine.

FIG. 5 is a flowchart showing steps of procedure of the inspection method.

In checking the injection molding machine for deterioration in accordance with the value of the pressure detected by means of the pressure sensor 4, the operator first causes the CPU 18 for PMC to carry out the aforementioned zero correction process shown in FIG. 2 or 3, stores the nonvolatile memory 24 with the correction value of the pressure sensor 4 obtained in the zero correction process (Step d1), Then, the operator initiates a control program for a deterioration detecting process stored in the ROM 13, and causes the CPU 18 for PMC substantially to start the deterioration detecting process.

After starting the deterioration detecting process, the CPU 18 for PMC delivers an injection start command to the CPU for CNC 25, thereby causing the CPU 25 for CNC and the servo CPU 20 to effect speed feedback control for the injection servomotor M1, and controls the driving current of the servomotor M1 so that the moving speed of the screw 2 is equal to the aforesaid predetermined speed (Step d2). Then, the CPU 18 for PMC temporarily stores a register Re with the value z of the injection pressure correctively outputted from the pressure sensor 4 through the pressure monitoring CPU 17 in accordance with the processing of FIG. 4 (Step d3), and stops the injection control by the CPU 25 for CNC (Step d4). Thereafter, the CPU 18 for PMC obtains a deviation or the difference between the injection pressure value p, detected by the pressure sensor 4 when the screw 2 of the injection molding machine adjusted in the normal state is driven for injection at the predetermined speed, and the injection pressure value z stored in the register Re, and determines whether or not the obtained value is within the range of a predetermined allowable value q (q>0) (Step d5).

If the deviation is within the range of the allowable value q (decision in Step d5 is N), the necessary driving torque of the injection servomotor M1 for the maintenance of the aforesaid predetermined speed during inspection is substantially equal to that required in the normal state. If the deviation is out of the range of the allowable value q (decision in Step d5 is Y), on the other hand, then it is considered that driving torque have been greatly reduced by wear of driving parts or increased by dragging or the like by the driving parts. Thereupon, the CPU 18 for PMC displays a request message for adjustment or the like on the display screen of the manual data input device 29 with display (Step d6), thereby informing the operator of the necessity of readjustment.

In this case, abnormality of the pressure sensor 4 itself need not be taken into consideration, so that the readjustment and identification of abnormal spots are easy.

The injection molding machine inspection system shown in FIG. 5 is just a simple example. Even in the case where the injection molding machine is checked for deterioration by detecting forces, such as the maximum injection pressure, back pressure, etc., which act on the screw 2 and comparing the values of these forces with reference values, necessary operations for inspection may be performed after calibrating the pressure sensor 4 by the zero correction method according to the embodiments described herein. By doing this, the accuracy of deterioration detection can be improved considerably.

Thus, in the zero correction method for a pressure detecting device according to the present invention, a thrust is positively applied to the screw by the drive source, and the reading deviation of the pressure sensor is corrected by comparing the known thrust applied to the screw and the actual reading of the sensor. Even when the screw is subjected to an unknown external force such as resin pressure, therefore, zero correction of the pressure detecting device can be achieved accurately. Moreover, reduction of the thrust affected by friction or the like in the transmission mechanism between the drive source and the screw can be canceled by reversing the thrust applied to the screw and taking the average of the output readings of the pressure sensor obtained when the thrust is applied in the forward and reverse directions so that the average can be used as a correction value. Thus, the zero correction can be effected more strictly.

What is claimed is:

1. A zero correction method for a pressure detecting device of an injection molding machine, in which a pressure acting on a screw is detected by a pressure sensor for detecting forward and reverse pressures acting on an injection force transmitting member, comprising the steps of:

applying a predetermined thrust in forward and reverse directions to the screw by a drive source;

obtaining the average of the values of outputs of the pressure sensor detected when the thrust is applied in the forward and reverse directions, individually, said average being used as a correction value for zero correction; and performing the zero correction.

2. A zero correction method for a pressure detecting device of an injection molding machine according to claim 1, wherein said thrust is applied to the screw for a period between completion of dwell and start of metering by the injection molding machine, a period between completion of suck-back and start of injection, or a period during a purging operation or between continuous purging operations.

3. A zero correction method for a pressure detecting device of an injection molding machine according to claim 1, wherein said thrust is applied to the screw which is kept in a stationary state.

4. A zero correction method for a pressure detecting device of an injection molding machine according to claim 1, wherein said thrust is applied to the screw when the screw is fixed and prevented from moving by a jig.

5. A zero correction method for a pressure detecting device of an injection molding machine according to claim 1, wherein aid thrust is applied to the screw by using a display or a control panel which is annexed to the injection molding machine.

6. A zero correction method for a pressure detecting device of an injection molding machine, in which a pressure acting on a screw is detected by a pressure sensor attached to an injection force transmitting member, comprising the steps of:

obtaining a deviation between a predetermined thrust and the value of an output of the pressure sensor detected when the predetermined thrust is positively applied to the screw by a drive source;

calculating a correction value for zero correction in accordance with the deviation; and performing the zero correction.

7. A zero correction method for a pressure detecting device of an injection molding machine according to claim 6, wherein said thrust is applied to the screw for a period between completion of dwell and start of metering by the injection molding machine, a period between completion of suck-back and start of injection, or a period during a purging operation or between continuous purging operations.

8. A zero correction method for a pressure detecting device of an injection molding machine according to claim 6, wherein said thrust is applied to the screw which is kept in a stationary state.

9. A zero correction method for a pressure detecting device of an injection molding machine according to claim 6, wherein said thrust is adjusted to a value not large enough to move the screw and not small enough that the thrust disappears in a path of transfer to the pressure sensor.

10. A zero correction method for a pressure detecting device of an injection molding machine according to claim 6, wherein said thrust is applied to the screw when the screw is fixed and prevented from moving by a jig.

11. A zero correction method for a pressure detecting device of an injection molding machine according to claim 6, wherein aid thrust is applied to the screw by using a display or a control panel which is annexed to the injection molding machine.

12. A zero correction method for a pressure detecting device of an injection molding machine according to claim 6, wherein said thrust applied to the screw has a value obtained by multiplying a driving current of a servomotor for driving the screw by a coefficient, which depends on the injection molding machine used.

13. A zero correction method for a pressure detecting device of an injection molding machine according to claim 6, wherein the output of said pressure sensor is read repeatedly, and said correction value is increased or decreased by predetermined degrees so that the deviation between output reading of the pressure sensor and the predetermined thrust is within an allowable range.

14. A zero correction method for a pressure detecting device of an injection molding machine according to claim 6, further comprising the steps of: previously storing, as a reference value, the output of the pressure detecting device detected when the screw of the injection molding machine adjusted in a normal state is moved at a predetermined speed; obtaining the current output of the pressure detecting device when the screw of the injection molding machine is moved a the predetermined speed; comparing the obtained current value with the reference value to see if the deviation between the two values is within a predetermined allowable range; and indicating a departure of the deviation from the allowable range or the necessity of readjustment of the injection molding machine, after carrying out the zero correction of said pressure detecting device.

15. A zero correction method for a pressure detecting device of an injection molding machine according to claim 6, wherein said thrust is adjusted to a value not large enough to move the screw and not small enough that the thrust disappears in a path of transfer to the pressure sensor.

* * * * *